United States Patent [19]

Powers et al.

[11] Patent Number: 5,212,347
[45] Date of Patent: May 18, 1993

[54] ELECTRICAL APPARATUS COVER PLATE

[75] Inventors: Carolyn E. Powers, Imperial Beach; Richard W. McKee, Costa Mesa, both of Calif.

[73] Assignee: Switch Stix Inc., Imperial Beach, Calif.

[21] Appl. No.: 709,235

[22] Filed: Jun. 3, 1991

[51] Int. Cl.⁵ .............................. H02G 3/14
[52] U.S. Cl. ........................ 174/67; 200/331
[58] Field of Search ........... 174/66, 67; 220/241, 220/242; 200/330, 331

[56] References Cited

U.S. PATENT DOCUMENTS

| | | | |
|---|---|---|---|
| 2,321,640 | 6/1943 | Adkins | 220/242 X |
| 2,354,224 | 7/1944 | Stein | 174/67 X |
| 2,493,581 | 1/1950 | Hood | 200/331 X |
| 2,988,242 | 6/1961 | Kneip | 220/242 |
| 3,068,442 | 12/1962 | Kubik et al. | |
| 3,892,935 | 7/1975 | Patterson | 200/331 |
| 4,042,903 | 8/1977 | Finegan, Jr. | 338/150 |
| 4,194,104 | 3/1980 | Stenta | 200/153 J |
| 4,590,345 | 5/1986 | Marshell | 200/331 |
| 4,607,136 | 8/1986 | Thomas | 174/67 |
| 4,711,634 | 12/1987 | Antone, II et al. | 439/136 |
| 4,731,511 | 3/1988 | Steinhilber et al. | 200/330 |
| 4,733,017 | 3/1988 | Wolf-Taylor et al. | 174/67 |
| 4,914,265 | 4/1990 | Mongeau | 200/330 |

Primary Examiner—Leo P. Picard
Assistant Examiner—David Tone
Attorney, Agent, or Firm—Gordon K. Anderson

[57] ABSTRACT

An electrical apparatus cover plate which has an enclosing base plate (20) mounted on a wall over electrical apparatus, such as toggle switches or convenience outlets. A slideable member, including a toggle actuator bar (42), nests within the plate and interfaces with the electrical switch toggle lever. A cap (26) covers and retains the bar which is longer than the base plate permitting the switch to be actuated by pushing the bar in a vertical direction transferring the movement to the switch. In another embodiment, the slideable member is a protective shield (50) that is retained through a dovetail arrangement provided in the base plate and covers a convenience outlet for protection also allowing the shield to be slid upward exposing the outlet and permitting an electrical plug to be inserted, also maintaining the uncovered position while in continued use.

10 Claims, 3 Drawing Sheets

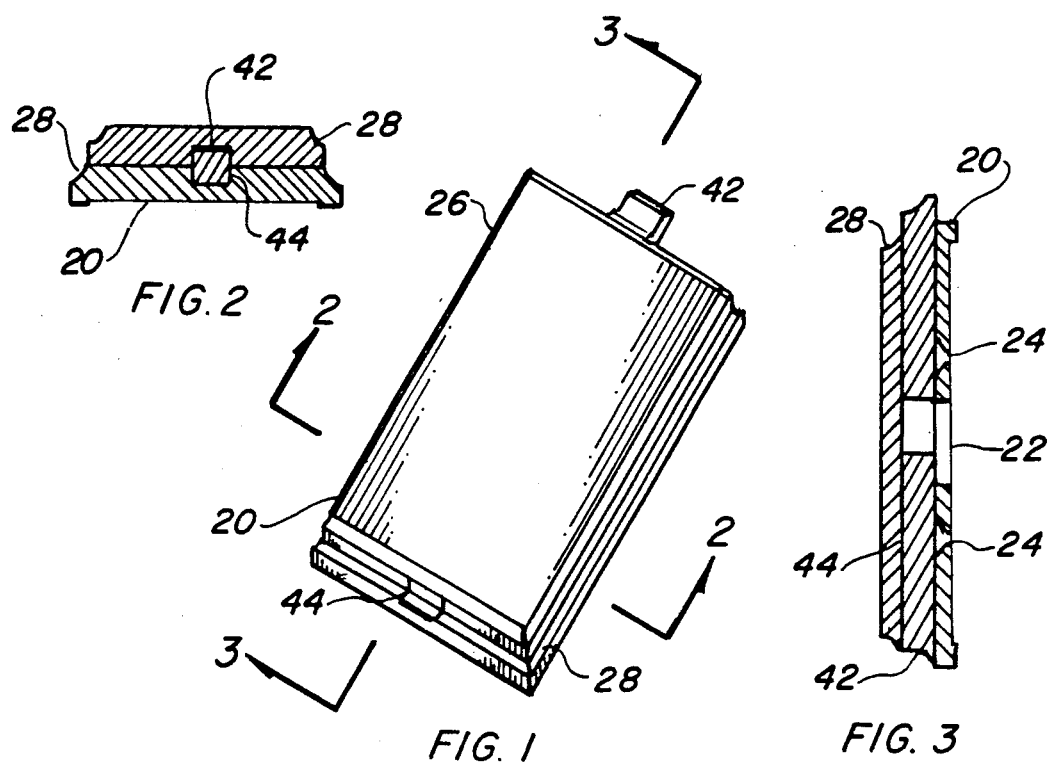
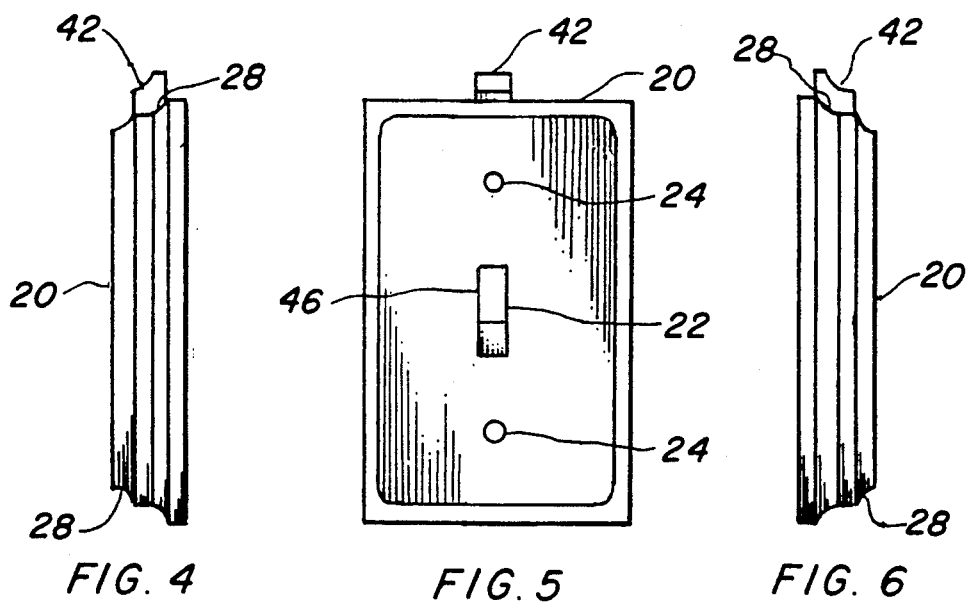
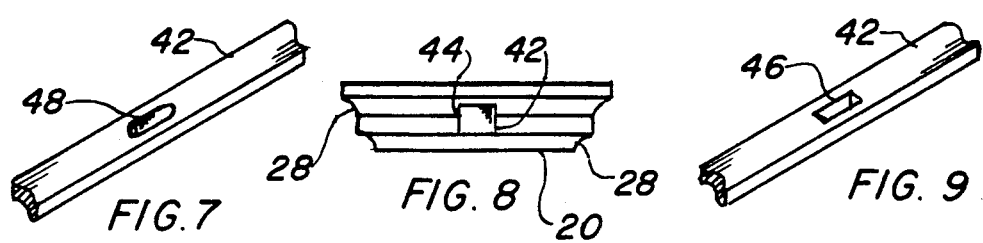

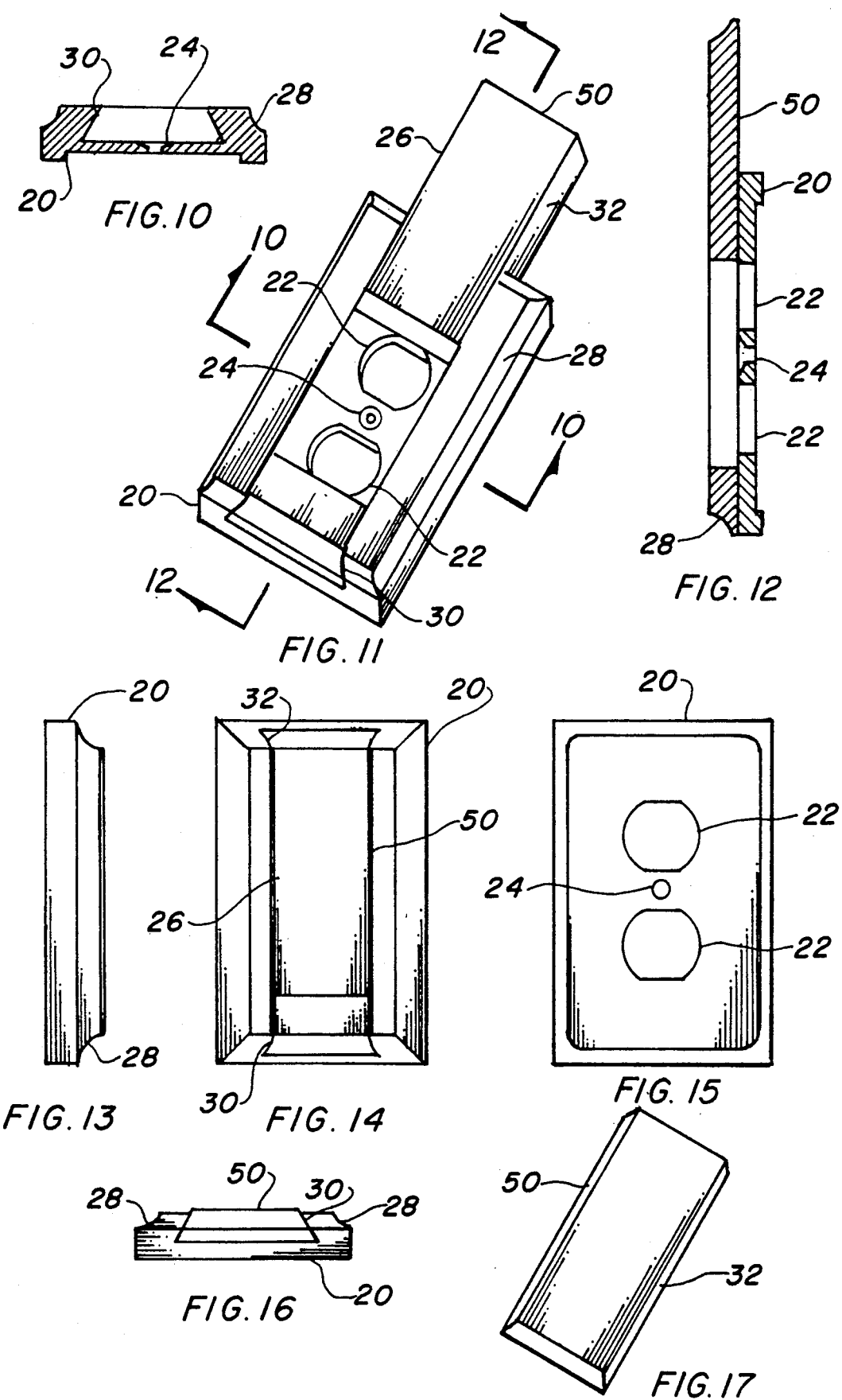

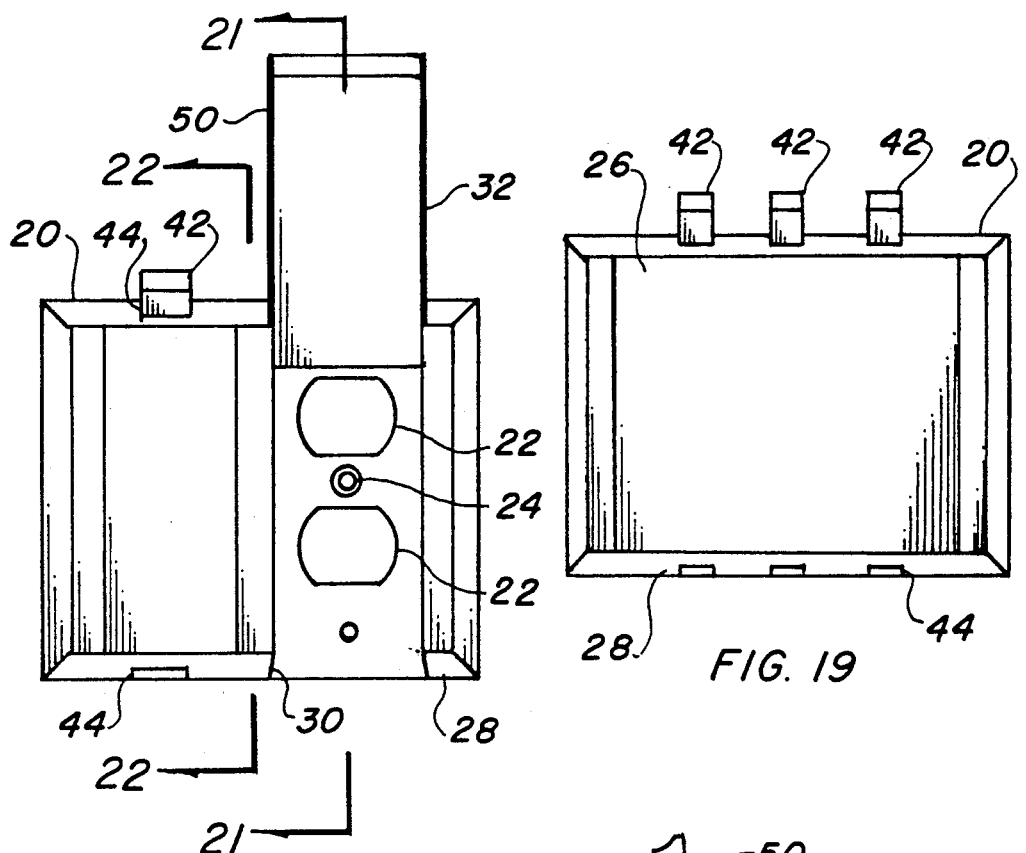
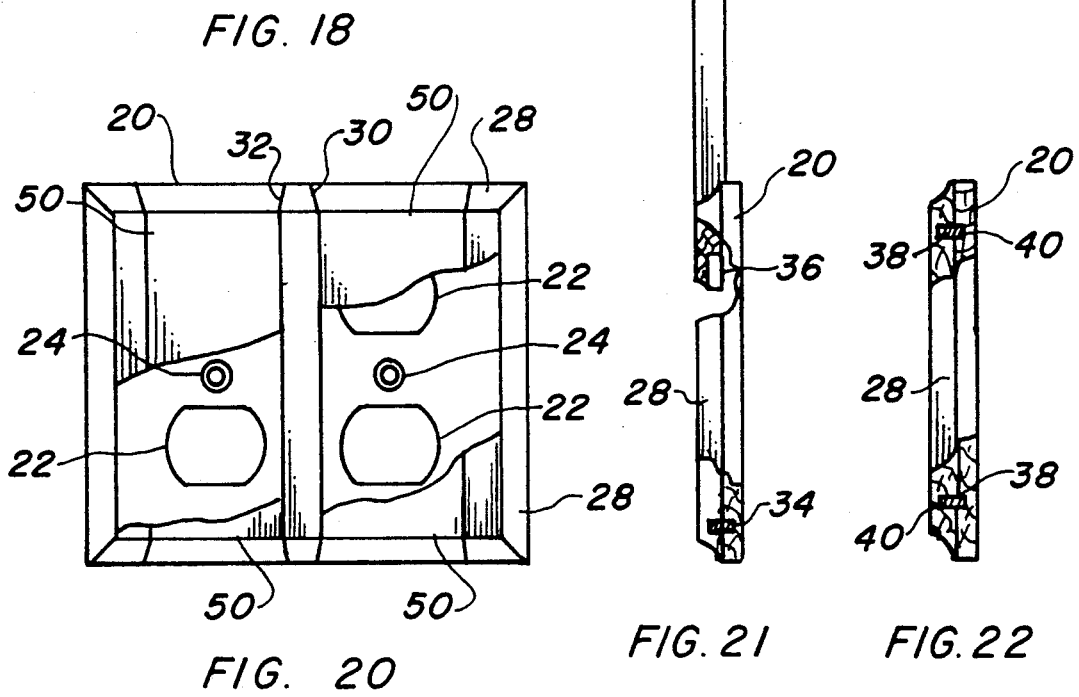

ELECTRICAL APPARATUS COVER PLATE

TECHNICAL FIELD

The present invention relates to cover plates for wall mounted electrical apparatus in general. More specifically, to a plate that decoratively covers a light switch or a convenience outlet on a wall using a sliding member to cover or actuate the electrical device.

BACKGROUND ART

Previously, many types of wall cover plates have been used in endeavoring to provide an effective and decorative means to physically protect and enhance the appearance of a wall switch or a convenience outlet. Some covers are spring loaded, others slide by friction to cover the receptacle and some switch covers add colored sliders that enclose and actuate a switch toggle lever.

A search of the prior art did not disclose any patents that are the same as the instant invention, however, the following U.S. patents were considered related:

| Patent No. | Inventor | Filing Date |
|---|---|---|
| 4,914,265 | Mongeau | Apr. 3, 1990 |
| 4,733,017 | Wolf-Taylor et al | Mar. 22, 1988 |
| 4,631,511 | Steinhilber et al | Mar. 15, 1988 |
| 4,711,634 | Antone II et al | Dec. 8, 1987 |
| 4,607,136 | Thomas | Aug. 19, 1986 |
| 4,194,104 | Stenta | Mar. 18, 1980 |
| 4,042,903 | Finegan, Jr. | Aug. 16, 1977 |
| 3,068,442 | Kubik et al | Dec. 11, 1962 |
| 2,988,242 | Kneip | Jun. 13, 1961 |
| 2,321,640 | Adkins | Jun. 15, 1943 |

Mongeau, in U.S. Pat. No. 4,914,265, teaches a replaceable cover plate of various colors and designs having a slider held in grooves. The inside of the slider has a cavity of a size compatible with a toggle on a switch. A set of cams in the slider and the plate retain and position the slider and a pair of resiliently deformable knobs maintain pressure on the slider and alternately engage the knobs with the plate.

U.S. Pat. No. 4,733,017 issued to Wolf-Taylor et al employ a pair of spring loaded sliding traverse plates which shift to open and close in front of an electrical wall outlet receptacle. The plates are in tracks and automatically spring to enclose the plug when released.

Steinhilber et al disclose in U.S. Pat. No. 4,731,511 a decorative wall plate and slider cap. A slider member having two barbed clips interact with protruding rail members for containment and fingers act as cams to move the toggle in the vertical direction. A decorative cap gives the form to the switch toggle.

U.S. Pat. No. 4,711,634 of Antone II et al employs a face plate with independent closures, each of which are biased to a closed position by tensioning members, such as rubber bands or helical springs. The receptacle is covered by guides positioned within the cover plate using the means of a mortise and tenon joint.

U.S. Pat. No. 4,607,136 issued to Thomas teaches a childproof protective device with a plate which covers and registers with a plug. The plate includes a pair of slideable doors or panels which are releasably locked in position with a pair of sliding locking members on the top and one on the bottom, precluding operation by children with small hands.

Stenta discloses in U.S. Pat. No. 4,194,104 a push button adapter with a plunger extending from one end. A spring holds the plunger and rotates a latch, when pushed, operating the switch.

U.S. Pat. No. 3,068,442 of Kubik et al employs a set of covers that shield the socket openings. Through a single control all of the socket openings may be exposed simultaneously for use. When a plug is removed, the cover spring loads closed. The cover slide is manually actuated with a vertically positioned control that unlatches the covers.

Kneip provides a hollow sheath-like case attached to a wall registering with openings for a receptacle in U.S. Pat. No. 2,988,242. A window-like safety shield is spring biased to close over the openings.

For background purposes and as indicative of the art to which the invention relates, reference may be made to the remaining cited patents issued to Finegan, Jr. and Adkins.

DISCLOSURE OF THE INVENTION

Electrical apparatus for controlling lights and providing electric outlets in walls of rooms are in almost universal use in nearly all of the homes and commercial buildings in this country. The common cover for such a device is an injection molded plate of thermoplastic in ivory or brown color or a metal plate zinc plated or galvanized. In order to enhance the decor, other materials have been used in the past, such as wood, mirrors, chrome plated steel, and the like, in most cases the same basic shape with either a slot or series of slots for the switches and round or slotted openings for the convenience outlets.

Although some attempt has been made to improve the appearance of these covers with color, material, or even creative forms, it is the primary object of the invention to provide a decorative cover which changes the shape entirely and employs a novel and unique method of operation, as well as allowing the use of rich exotic materials. The invention, therefore, creates a new atmosphere in the room particularly on walls that ordinarily have little decoration, as attention is drawn immediately to an unexpectantly different, rich and attractive operational cover.

The invention is incorporated into two embodiments, one covering a light switch, having a toggle actuator and the other a convenience outlet in singles, multiples, or combinations thereof. The material may be wood in any of it's exotic forms, or a plastic composition, preferably a thermoset, in many varieties, such as counter top material known by it's trademark CORIAN. In either case, the richness and expense of the material is obvious and the fact that the normal switch or receptacle is completely covered adds to the appearance and novelty of the invention.

An important object of the invention, in the convenience outlet cover embodiment, is the safety it affords, as it completely covers the receptacle and allows access only when slid upwardly exposing the electrical device. This protection eliminates problems with small children as it would require two hands and coordination to lift the cover and insert a metal object into the receptacle which is highly unlikely in children of an age where they do not understand the dangers involved. The cover is held open, out of the way, by the inserted plug when in use and gravity returns the cover to its closed position when the plug is removed.

Another object of the invention requires no alteration or modification to the electrical apparatus, either a toggle switch or a receptacle. The existing plate or cover is removed and the invention is mounted in place with the existing screws or, if desired, additional screws may be included with the device, when marketed, for convenience. At any rate, the installation is quick and easily accomplished with only a common screwdriver required for a tool.

When installed, still another object of the invention allows the user to operate the switch easily or uncover the receptacle without difficulty as the operation is obvious to the user. The switchplate embodiment provides an actuator bar that protrudes vertically from the cover either above or below and when unfamiliar with the device the physical location of the invention on the wall indicates its utility and the bar is in either one or the other position according to the operation of the light. The convenience outlet is similarly obvious as the appearance directs the user to its sliding ability and a stop limits the travel downward allowing only one possibility left for correct operation.

Yet another object of the invention prevents the wall upon which the cover is raised from the surface and the bar or bars are positioned away from the wall sufficiently to preclude the necessity of rubbing the wall to find and actuate the switch.

A further object of the invention allows ease of manufacture in a myriad of materials allowing the decorative affect to be realized and coordinated with the room color and decor. Further, the invention may be used as single switch and receptacle covers or so called gang type in multiples, also combinations side by side. The ease of manufacture allows almost any material with an aggregate of electrical apparatus to be combined with equal ease and dispatch.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment in the switch cover embodiment.

FIG. 2 is a cross-sectional view taken along line 2—2 of FIG. 1 illustrating the horizontal cross-section.

FIG. 3 is a cross-sectional view taken along line 3—3 of FIG. 1 illustrating the vertical cross-section.

FIG. 4 is a right view of the switch cover embodiment.

FIG. 5 is a rear view of the switch cover embodiment.

FIG. 6 is a left view of the switch cover embodiment.

FIG. 7 is a partial view of the toggle actuator bar with the cavity in a rectangular shape.

FIG. 8 is a bottom view of the preferred embodiment.

FIG. 9 is a partial view of the toggle actuator bar with the cavity in a slotted shape.

FIG. 10 is a cross-sectional view taken along line 10—10 of FIG. 11 illustrating the horizontal cross-section.

FIG. 11 is a partial isometric view of the preferred embodiment in the convenience outlet cover embodiment.

FIG. 12 is a cross-sectional view taken along line 12—12 of FIG. 11 illustrating the vertical cross-section.

FIG. 13 is a left view of the preferred embodiment.

FIG. 14 is a front view of the convenience outlet embodiment.

FIG. 15 is a rear view of the convenience outlet embodiment.

FIG. 16 is a bottom view of the convenience outlet embodiment.

FIG. 17 is a partial isometric view of the protective shield completely removed from the invention for clarity.

FIG. 18 is a front view of the preferred embodiment in a combined switch and outlet embodiment.

FIG. 19 is a front view of the preferred embodiment in a multi-switch embodiment.

FIG. 20 is a partial cut-away front view of the preferred embodiment in a multi-outlet embodiment.

FIG. 21 is a cross-sectional view taken along line 21—21 of FIG. 18 illustrating the pin retaining means for the cap to the base plate.

FIG. 22 is a cross-sectional view taken along line 22—22 of FIG. 18 illustrating the resilient insert retaining means for the cap to the base plate.

BEST MODE FOR CARRYING OUT THE INVENTION

The best mode for carrying out the invention is presented in terms of a switch cover embodiment and a convenience outlet embodiment both employing the same base plate and slideable member, however, the specific electrical apparatus requires slightly different configuration in both elements.

The switch cover embodiment, shown in FIGS. 1 through 9, 18 and 19 includes an enclosing base plate 20 that has mating openings 22 large enough to be compatible with the electrical switch or apparatus conventionally found in homes and commercial buildings. These switches, basically the toggle lever type, in most cases follow an industry standard with regard to size and configuration, also they include a pair of tapped holes spaced 2.375 inches (6 CM) apart for mounting the cover to the switch with a pair of flat head machine screws.

The invention attaches to the switch with these screws inserted through countersunk bores 24 holding the base plate 20 flush with the wall, covering the electrical box and wiring normally used in conjunction with the switch.

A concealing cap 26 is connected to the base plate 20, with retaining means, forming a decorative top while covering the outwardly exposed surface of the base plate. For decorative purposes the peripheral edges of both the cover 20 and cap 26 may include a beveled surface 28 either angular, radial or a combination thereof, such as would normally be formed in wood with a datto head or similar tool.

The retaining means attaching the cap 26 to the baseplate 20 may include any method suitable for the application, such as a dovetail formed in the two elements. This dovetail is preferably vertical, with the female groove 30 integrally formed within the baseplate 20 and the male wedge shape 32 in the cap 26, as shown in FIGS. 10 and 11. A stop to prevent the cap 26 from falling through the dovetail on the bottom may be accomplished using a pin 34 pressed into the base plate 20 and a recess 36 formed into the cap 26, as illustrated in FIG. 21, covering the pin 34, when assembled, and yet, allowing the cap 26 to be easily removed for assembly and replacement if necessary. Another acceptable method of retention, particularly in the structural plastic configuration, is the use of mating holes 22 in open end alignment and a resilient insert 40, having a series of barbs on one end and a rounded tab on the other, pressed into the holes retaining the elements together in a removable manner. This method of retaining the cap 26 to the base 20 again is not visible from the outside and provides the necessary detachment. Another method is illustrated in FIG. 11 where the slideable member is split into two pieces with one permanently attached into the dovetails in a bottom portion acting as the stop while still maintaining the same appearance although a seam is visible when the cap is closed.

The slideable member in this embodiment is a toggle actuator bar 42 that is disposed between the base 20 and the cap 26 in a tunnel 44 formed by a recess in each element. The bar 42 includes a cavity slightly larger than a conventional switch toggle lever and the toggle penetrates this cavity, retaining the bar 42 within the tunnel 44. The cavity may be rectangular 46 in shape, as shown in FIG. 9, or in the shape of a slot 48, as illustrated in FIG. 7.

The toggle actuator bar 42 is longer than the height of the combined base plate 20 and cap 26 and, therefore, permits actuating the switch by pushing one end of the bar in one direction or the other. As the bar 42 is held captive by the switch toggle lever, the operation of the switch is simply transferred to the outside of the cover.

In the convenience outlet cover plate embodiment of the invention, shown in FIGS. 10 through 17 and 20, the slideable member is a protective shield 50 that is retained by the enclosing base plate 20 providing a guard over the electrical convenience outlet. The shield 50 is retained by the base plate 20 with a female dovetail groove 30 and this shield is formed at the vertical sides into a male wedge shape 32. The shield 50, therefore, is free to slide upwardly, as shown in FIG. 11, still captivated in the dovetail joint and allows access to the electrical outlet or outlets located underneath. The shield 50 is prevented from dropping through the bottom portion of the dovetail by either splitting the shield into two pieces, as previously described, and permanently fastening the bottom portion. It may also be retained with a pin 34 and recess 36 as described for the cap 26 retension, also depicted in FIG. 21. In any event, the shield 50 is operable by simply sliding upwardly to expose the electrical outlets and the plug that connects electrically, holds the shield 50 in place.

It will be noted that the conventional duplex electrical receptacle provides a single flat head screw for mounting into the countersunk bore 24 where the single toggle switch normally employs two screws. The underside of the base plate 20 for either embodiment is recessed for the appropriate electrical device covering any protrusion from the junction box holding the device.

The invention is capable of being utilized on almost any configuration of switch, toggle, rotary, rheostat type, etc., also with the receptacle, two pin grounded type or so-called TWIST-LOC type.

It is further possible to combine the two embodiments into one single base plate, as shown in FIG. 18, and any number of switches or receptacles that are ganged together may be protected and actuated by the invention as pictorially illustrated in FIGS. 19 and 20 allowing considerable flexibility of choice for the user.

As the invention is directed towards an improved decorative device, the material used in its construction is very important as far as its appearance is concerned. The simplicity and small number of elements allow the invention to be fabricated of natural wood in almost all of its forms. Hardwood is particularly well adapted and in some of the more exotic woods, such as burl, crotch or fiddleback walnut, redwood in the burl and curly variety, mesquite, oak, maple, especially the birdseye type, teak, mahogany, myrtle, cherry, and a host of others.

The decorative cover may also be fabricated using a plastic material, such as employed in counter tops as solid surface products which are well known for their beauty and durability. Examples of this thermoset plastic are known in the industry by their registered trademark, which include CORIAN, AVONITE, AVON INC, SWAN STONE, FOUNTAINHEAD, NEVER MAR, and GIBRALTER.

Any type of thermoplastic may also be employed using injection molding, such as, but not limited to, acrylic, cellulosics, phenolic, polyethylene, polypropolene, polystyrene, polyvinyl chloride, polyester, polycarbonate, and the like.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

We claim:

1. A decorative cover plate for electrical apparatus mounted flush with a building wall having at least one threaded hole for screw attachment comprising:
    an enclosing base plate having at least one mating opening of a size large enough to accommodate exposed electrical apparatus and at least one countersunk bore, also retaining means integral therewith,
    at least one screw extending through the bore for insertion into the threaded hole of the electrical apparatus for mounting the plate contiguous with a wall safely covering the electrical apparatus therewithin,
    a concealing cap removably connected to the enclosing base by said retaining means, forming a decorative top while covering the base plate exposed surface, and
    at least one toggle actuator bar slideably disposed between the base and cap in alignment with and enclosing a toggle lever protruding from said electrical apparatus allowing the apparatus to be switched on and off by urging the actuator in a linear direction and be retained therein in a slideably manner providing a decorative cover while allowing operation of the electrical apparatus.

2. The cover plate as recited in claim 1 further comprising; a matching beveled surface on the outer periphery of the base plate, concealing cap and toggle actuator providing a decorative trim thereupon.

3. The cover plate as recited in claim 1 wherein said retaining means of said base to said cap define a dovetail therebetween and a stop disposed within said base allowing the cap to slide within the dovetail and be restricted from falling out by the stop.

4. The cover plate as recited in claim 1 wherein said retaining means of said base to said cap comprise; a plurality of resilient inserts having a number of barbs on one end and a rounded tab on the other with said base and cap each having mating holes in direct alignment and the insert pressed within the holes providing retension of the elements connected therewith.

5. The cover plate as recited in claim 1 wherein said toggle actuator bar further comprises; each bar having a cavity slightly larger than a switch toggle lever of the electrical apparatus with the lever penetrating the cavity retaining the bar between the base and cap and permitting operation by pushing an exposed end of the bar to manually operate the electrical apparatus.

6. The cover plate as recited in claim 5 wherein said cavity in the bar is rectangular in shape.

7. The cover plate as recited in claim 5 wherein said cavity in the bar is in the shape of a slot.

8. The cover plate as recited in claim 1 further comprising;
   a protective shield slideably retained by the enclosing base parallel with said concealing cap and toggle actuator providing a guard over the electrical apparatus also allowing accessibility by sliding away therefrom.

9. The cover plate as recited in claim 8 wherein said protective shield is retained by the base with a dovetail groove integrally formed in the base and the protective shield having mating tapered edges interfacing slideably therebetween.

10. A decorative cover plate for electrical apparatus mounted flush with a building wall having at least one threaded hole for screw attachment, the cover plate comprising;
   a partially enclosing base plate having a dovetail therein and a mating opening of a size compatible with each exposed electrical apparatus and at least one countersunk bore,
   at least one screw extending through the bore for insertion into the threaded hole of the electrical apparatus for mounting the plate contiguously with a wall safely covering the apparatus therewithin, and
   a protective shield slideably retained by the dovetail in the partially enclosing base plate providing a guard over the electrical apparatus also allowing accessibility by sliding away therefrom.

* * * * *